US006824089B2

(12) United States Patent
Gross et al.

(10) Patent No.: US 6,824,089 B2
(45) Date of Patent: Nov. 30, 2004

(54) WOOD COLLECTION AND REDUCING MACHINE

(76) Inventors: Thomas R. Gross, 1843 Eastern Ave., Weidman, MI (US) 48893; Earl R. Smith, 2409 W. Jordan, Mt. Pleasant, MI (US) 48858

( * ) Notice: Subject to any disclaimer, the term of this patent is extended or adjusted under 35 U.S.C. 154(b) by 99 days.

(21) Appl. No.: 10/076,638

(22) Filed: Feb. 16, 2002

(65) Prior Publication Data

US 2002/0113154 A1 Aug. 22, 2002

Related U.S. Application Data

(60) Provisional application No. 60/286,477, filed on Apr. 25, 2001, and provisional application No. 60/269,653, filed on Feb. 16, 2001.

(51) Int. Cl.[7] .............................................. B02C 13/20
(52) U.S. Cl. ............................... 241/261.1; 144/162.1; 144/172; 144/220
(58) Field of Search ....................... 241/92, 93, 101.75, 241/277, 278.1, 293, 261.1; 144/393, 235, 174, 172, 162.1, 218, 220

(56) References Cited

U.S. PATENT DOCUMENTS

| | | | |
|---|---|---|---|
| 2,854,047 A | | 9/1958 | Schmidt |
| 3,875,984 A | * | 4/1975 | Plough .................... 144/162.1 |
| 3,944,147 A | * | 3/1976 | Pletcher ...................... 241/60 |
| 3,989,198 A | | 11/1976 | Blasko |
| 4,009,837 A | | 3/1977 | Schnyder |
| 4,077,450 A | | 3/1978 | Ackerman |
| 4,162,769 A | * | 7/1979 | Lapointe ....................... 241/68 |
| 4,260,114 A | | 4/1981 | Herder |
| 4,738,402 A | * | 4/1988 | Downie ................... 241/46.01 |
| 5,005,620 A | * | 4/1991 | Morey ........................ 144/373 |
| 5,209,278 A | | 5/1993 | Carpenter et al. |
| 5,390,862 A | * | 2/1995 | Eglin .......................... 241/29 |
| 5,692,548 A | * | 12/1997 | Bouwers et al. ............ 144/174 |
| 5,836,528 A | * | 11/1998 | Hilgarth ...................... 241/93 |
| 6,032,707 A | | 3/2000 | Morey et al. |
| 6,036,125 A | | 3/2000 | Morey et al. |

* cited by examiner

Primary Examiner—Allen Ostrager
Assistant Examiner—Shelley Self
(74) Attorney, Agent, or Firm—Dean B. Watson

(57) ABSTRACT

A machine for collecting and reducing wood including a prime carrier; a debris collector operatively attached to the prime carrier; a shredder assembly attached to the prime carrier, the shredder assembly having an input and an output; a storage bin for holding reduced wood, the storage bin attached to the prime carrier; and a conveyor adapted to move reduced wood from the output of the shredder assembly to the storage bin. The prime carrier may also have a universal adapter of substituting attachments.

A variable torque, drum shredder for reducing wood. The drum shredder includes a housing; a tapered cutting drum rotatably mounted within the housing; an anvil; at least one cutting blade disposed about an outer surface of the cutting drum to provide a compound cutting angle; and a drive connected to the cutting drum.

A shredder having a discharge assembly adapted for accommodating discharged material with at least two major discharge streams with at least two major discharge directions.

21 Claims, 7 Drawing Sheets

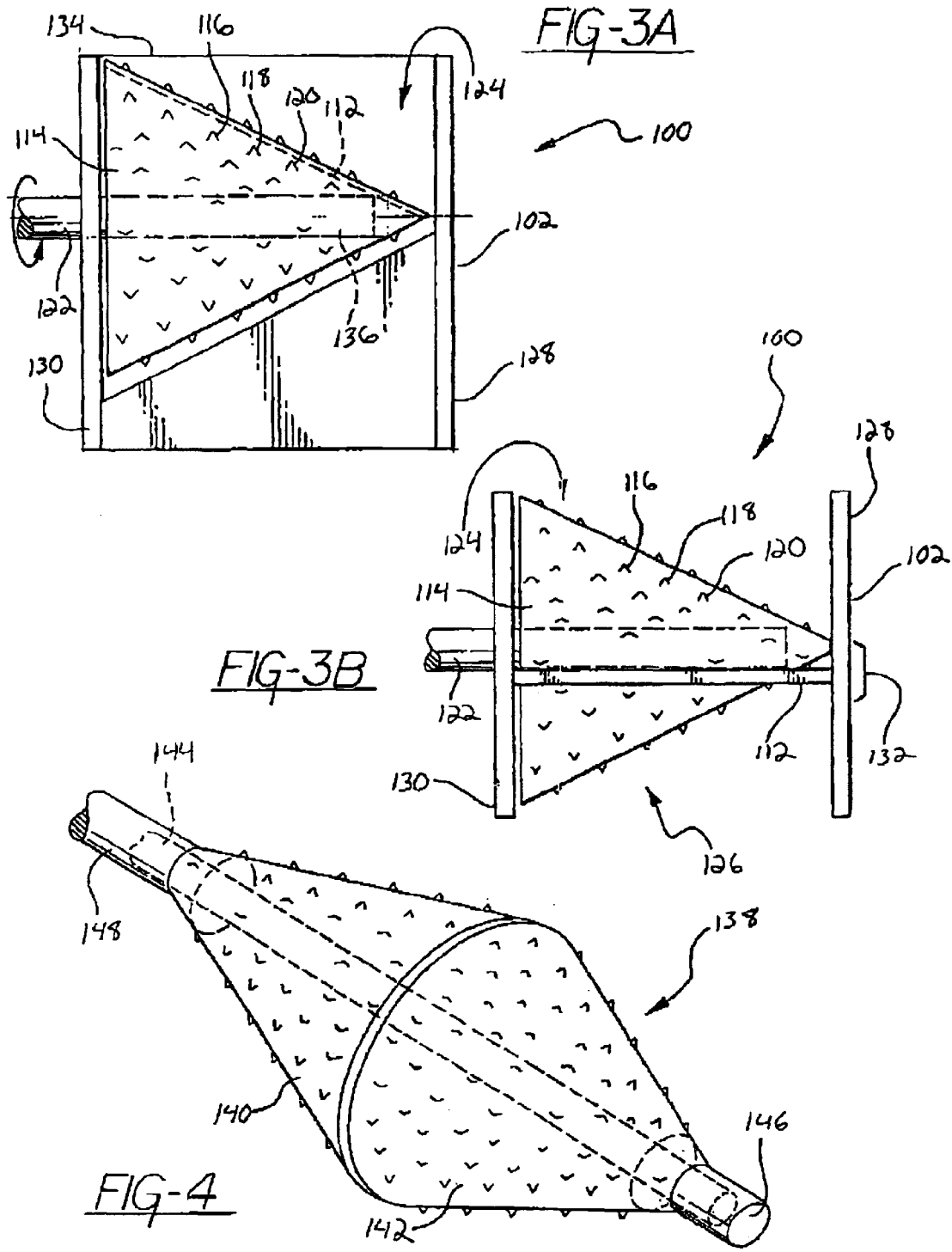

WOOD COLLECTION AND REDUCING MACHINE

CROSS-REFERENCE TO RELATED APPLICATIONS

The present invention relates to, and is entitled to the benefit of the earlier filing date and priority of: U.S. Provisional Patent Application No. 60/269,653, filed Feb. 16, 2001, entitled "Wood Collection and Reducing Machine" and U.S. Provisional Patent Application No. 60/286,477, Filed Apr. 25, 2001, entitled "Wood Collection and Reducing Machine" to the same inventors hereof, the disclosures of which are hereby incorporated herein by reference.

BACKGROUND OF THE INVENTION

I. Field of the Invention

The present invention pertains to machines for collecting, reducing, compacting and removing wooden materials, and more particularly to drum chippers and shredders.

II. Description of the Background

Urban removal of wood and debris at the curbside is presently accomplished using a number of labor intensive or environmentally unfriendly methods. These methods include burning, bundling at curbside with rope or twine, and collection by city crews using portable shredders.

Burning, although less used today than years past, results in smoke and pollutants being discharged into the air. This method is particularly a problem during days of high pressure which forces smoke to hover at low altitudes and create a nuisance. As a result, burning has been banned by law in many communities.

Most urban collection of wood is currently done by bundling twigs and branches with rope or twine and setting then at the curbside for collection. The bundles are collected by crews, placed in trucks and transported to land fills or compost piles for disposal. One problem with bundling is that compliance with proper collection rules is low. Compliance problems typically arise when people bundle branches in excess of the size or weight designated by collection crews. Problems can also arise when people fail to properly tie the bundles. Bundles that fail to comply with collection rules are typically left at the curbside by collection crews and may sit for weeks thereby becoming an eye sore and a road hazard.

Another method of removing wood debris is with portable high-speed shredders. To remove curbside debris, crews hand-feed branches into a shredder. The hand-fed branches are quickly reduced and blown into the back of a truck, often with the aid of a high-power blower system. Although this method is fairly effective at reducing wood debris, the method fails in many other respects. First, the method provides an inefficient use of labor, as it requires multiple crewmembers to drive the truck and handle the branches. Secondly, present day chippers and shredders generate large amounts of noise pollution. Excessive noise pollution arises from both the high speed cutting implements and from the high power blower systems. Noise pollution also arises from high speed impacting of the cutting implements upon the material being shredded.

Present day shredders also are very dangerous. When branches are hand fed into rotating high-speed blades, the blades quickly grab and pull the branches. If an operator fails to pay close attention to the job at hand, the operator can be pulled into the shredder and severely injured. Another hazard arises from flying debris. Flying debris occurs from splintered wood being ejected back towards the operator from the high-speed cutting blades. Because of the dangers involved in using high-speed portable shredders, the inefficient use of labor, and the excessive noise pollution generated, methods of urban wood removal are in need of improvement.

Therefore, what is needed for effective urban collection of wood debris is a quieter, lower-speed shredder that is safer and needs only a single person to operate.

SUMMARY OF THE INVENTION

The present invention addresses the above mentioned problems and others by providing a machine for collecting and shredding wood which includes: a prime carrier; a debris collector operatively attached to the prime carrier; a shredder assembly attached to the prime carrier, the shredder assembly having a wood input and an output; a storage bin for holding reduced wood, the storage bin attached to the prime carrier; and a conveyor disposed between the output and the storage bin for moving reduced wood away from the output of the shredder.

In another aspect of the invention, there is provided a machine for collecting and shredding wood as described above which further includes a compactor for receiving wood from the conveyor and compressing the wood into the storage bin.

In still another aspect of the invention there is provided a tapered drum shredder for reducing wood. A preferred drum shredder includes a housing; a tapered cutting drum rotatably mounted within the housing; an anvil adjacent to the cutting drum; at least one cutting blade disposed about an outer surface of the cutting drum to provide a compound cutting angle; and a drive connected to the drum to provide rotation. The cutting drum is preferably tapered with a nose or nose end and a back or butt end which forms a cone, frustum or cone like shape, e.g. a cutting cone. A cutting cone provides a cutting surface with a plurality of cutting speeds and variable torque. The cutting drum preferably includes a plurality of cutting cones connected in series. The drum shredder preferably includes a plurality of cutting drums.

Preferably the drum shredder has an anvil; a variable torque, rotatable cutting drum, which cooperates with the anvil to form an acute cutting angle; at least one cutting blade disposed about an outer surface of the cutting drum; and a drive operatively connected to the drum for rotation.

In a preferred embodiment the drum shredder has a gravity feed chute with substantially vertical walls and a floor. In another embodiment the feed chute is substantially horizontal. In still another embodiment the feed chute is a side feed.

In one embodiment of the invention the at least one cutting blade is a plurality of cutting blades. In a preferred embodiment of the invention each cutting cone, or each section of the cutting drum has at least one cutting blade, which may extend along the length of the associated cutting cone or section. In another embodiment of the invention, each cutting blade may be a removable hammer with a reversible cutting edge.

In a preferred embodiment of the present invention there is provided a drum shredder having more than one cutting drum rotatably mounted in the shredder. The drums may share the same drive and be connected together or alternatively may have separate drives. In a preferred embodiment a plurality of cutting drums are mounted side by side. In a more preferred embodiment, a plurality of cutting drums are mounted coaxial with one another. In a most preferred embodiment the plurality of cutting drums are mounted coaxial with one another and fixed nose to nose.

In one aspect of the present invention, there is provided a shredder having a discharge assembly adapted to receive at least two major streams of chips having different discharge directions and deposit then efficiently into a storage bin, or away from the shredder assembly. In a preferred embodiment hereof the discharge assembly includes a bellyband, a transition in communication with the bellyband, and a discharge port in communication with the transition, wherein the bellyband conforms to and follows with the cutting drum for guiding reduced material to the transition.

For a more complete understanding of the present invention, reference is now made to the accompanying drawings and following detailed description of the preferred embodiments. Throughout the several figures and views, like symbols refer to like elements.

BRIEF DESCRIPTION OF THE DRAWINGS

FIG. 3a is a partial top view of a variable torque shredder;

FIG. 3b is a cross-sectional, partial side view of a variable torque shredder;

FIG. 4 is a partial side view of a variable torque shredder having coaxial cutting cones in accordance with a preferred embodiment of the present invention;

DETAILED DESCRIPTION OF THE PREFERRED EMBODIMENTS

Figure 1:
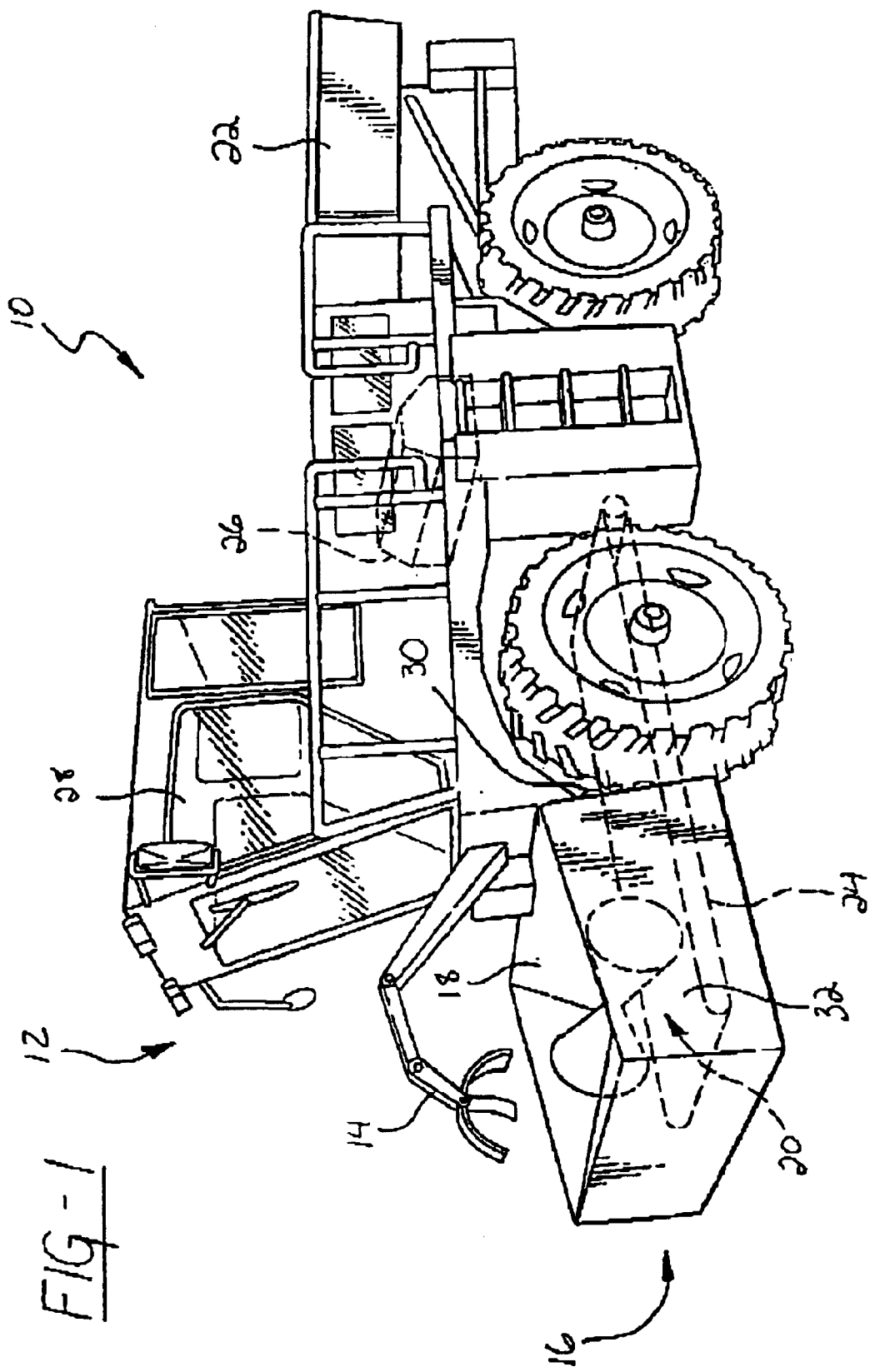
FIG. 1 is a side view of a machine for collecting and shredding wood in accordance with the present invention.

Now with more particularity and with reference to FIG. 1, generally depicted therein at 10 is a preferred embodiment of a machine for collecting and shredding wood.

The machine includes a prime carrier 12; a debris collector 14 operatively attached to the prime carrier 12; and a shredder assembly 16. The shredder assembly 16 has a wood input 18 and an output 20. A storage bin 22 for holding reduced or shredded wood is attached to the prime carrier 12. A conveyor 24 may be disposed between the output 20 and the storage bin 22. The conveyor 24 is for moving reduced wood away from the output 20 of the shredder assembly 16 to the storage bin 22.

The prime carrier 12 is a motorized vehicle having an engine 26 and an operator compartment or cab 28. Preferably the prime carrier has wheels, as opposed to tracks, to allow for street travel at posted speeds and for fuel economy. The prime carrier 12 provides support, mobility and may provide power to heavy accessories, including the shredder assembly of the present invention and other accessories. The prime carrier 12 may also have a universal adapter 30 or universal connection, which provides convenient interchangeability of accessories for varied uses. The universal adapter is preferably a ledge or flange that mates with a recess in an accessory and is strong enough for support. Accessories which may be attached via the universal adapter 30 and operated by the prime carrier 12 include: a snow blade or a snow blower for snow removal; a brush sweeper or rotating brushes for street cleaning; rotating rakes for leaf collection; lawn mower for grass cutting, stump grinder, or road grader, etc. Preferably, the prime carrier 12 is adapted for interchangeability of the shredding assembly 16, as described herein, with a leaf collection system, as described in co-pending U.S. patent application Ser. No. 09/494,798, entitled "Leaf Gathering and Compressing Machine and Method", by Gross et al., filed Jan. 31, 2000, the disclosure of which is herein incorporated by reference.

The collector 14 is a device for gathering debris, such as wood, brush, twigs, branches etc, and delivering the debris to the shredder assembly. As shown, the collector 14 is a movable arm, such as a knuckle arm, with a grapple. The collector 14 may be controlled electrically or may be controlled with hydraulics. The collector 14 is preferably attached at a front end of the prime carrier 12 and is preferably operated from within the cab 28. By placing the collector 14 at or near the front of the prime carrier, the view of the operator when gathering debris on the ground or at curbside can be substantially improved.

The shredder assembly 16 may be any wood reducing, cutting, or shredding device. The shredder assembly 16 has an input 18 for feeding wood to a reducing or cutting element and an output or discharge 20 for discharging reduced material. Wood reducing, cutting and shredding devices are generally known and include both shredder type and chipper type machines. Suitable shredder assemblies include disk type chippers, drum type chippers, rotor type chippers, shredders, hammer mills, etc. Preferably the shredder assembly 16 is a variable torque, drum shredder, as described in detail below or shown in FIGS. 3a–6 and 8. Examples of other types of shredder assemblies that may be adapted for use with the machine 10 of the present invention and attached to the prime carrier 12 include those described in: U.S. Pat. Nos. 5,836,528; 6,082,644; 5,469,901; 4,077,450; 5,692,548; 6,032,707; 5,961,057; 3,436,028, the disclosures of which are herein incorporated by reference.

The shredder assembly 16 preferably has a feed hopper 32 and a low-speed, high-torque cutting implement. A low-speed, high-torque cutting implement reduces flying debris, lowers noise levels, and improves safety. Preferably the low-speed cutting implement rotates about a cutting axis at a speed of less than 1,200 RPM, more preferably at a speed of less than 700 RPM, and most preferably at a speed of 400 RPM or less, but preferably at a speed of 100 RPM or greater. A shredder assembly with a feed hopper 32 and a low-speed, high-torque cutting implement provides an urban debris collection machine with reduced hazards and noise. For example, wood may be placed in the hopper where it can be slowly but continuously shredded as the prime carrier moves from location to location. Because the loading of the shredder can be spaced over intervals, the time between loads allows slower but continuous grinding between collection sites. The slower grinding reduces noise levels and flying debris thereby making the device more suitable for urban collection than present day high-speed shredders, which provide only immediate wood reduction.

The machine 10 may also have a conveyor 24 for transporting reduced wood away from the discharge path of the shredder assembly output 20. The conveyor is disposed between the output 20 and the storage bin 22. Preferably the universal adapter of the prime carrier 12 supports the conveyor 24 so that the conveyor may be used with attachments other than the shredder assembly as described above. Preferably the conveyor 24 is a non-blower conveyor system, such as a screw, band system, roller system or gravity feed chute, or combination of the above, all of which provide transportation of wood chips and debris without the high noise levels typically associated with blower or thrower type systems.

Figure 2:
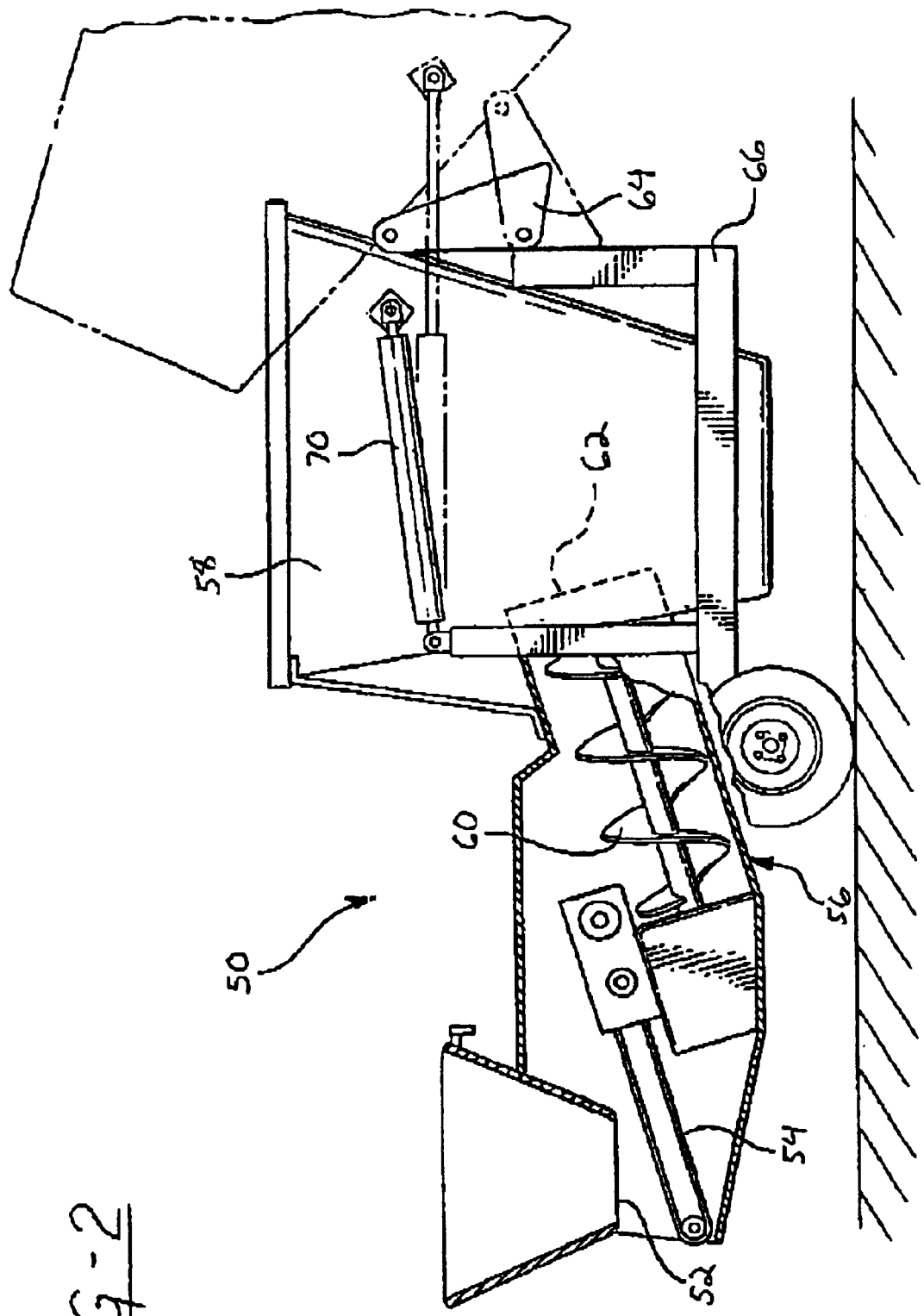
FIG. 2 is a side view of a rear portion of a machine for collecting and shredding wood in accordance with the present invention.

Referring now to FIG. 2, depicted therein at 50 is a partial, side view of a prime carrier having a shredder assembly output 52, a conveyor 54, a compactor 56 and a storage bin 58. The conveyor 54 is preferably a conveyor band. The conveyor band may have projections or paddles extending from the band for enhancing material movement in the direction of band travel. The conveyor 54 may be in direct communication with the storage bin or may be in communication with other devices which can further process the reduced debris, such as the compactor as describe below.

Preferably the machine includes a compactor 56 for compressing debris into the storage bin. The compactor 56 may be integral with the conveyor, such as when the conveyor is a screw; or the compactor may be a system separate from the conveyor. As the storage bin 58 fills, the compactor 56 reduces the volume of incoming material to enhance space utilization.

Preferably the compactor is a screw 60 rotatably mounted downstream from the conveyor 54. The conveyor 54 is mounted upwardly at an angle to deliver debris to the top of the screw 60. By mounting the conveyor 54 upwardly at an angle to deliver debris to the top of the screw 60, jamming of debris at the output/conveyor interface or at the conveyor/compactor interface can be greatly lessened while at the same time accentuating spatial displacement of the system. The screw 60 collects debris and forces it into the storage bin 58 through an opening 62. Preferably the debris is forced in at a bottom portion of the storage bin 58 or a at point below ½ the volume height of the container. Preferably the opening in the bin is above the very bottom of the bin and may be adjustable, such that the opening can be shifted over a number of locations from the bottom of the bin to about the ½ volume height. By forcing debris into the bin at a bottom portion thereof, enhanced compaction utilizing the force of incoming material against the weight of stored material can be obtained without jamming the compactor. If jamming occurs the opening of the feed can be raised to reduce the amount of compaction. If the amount of compaction desired is greater, the opening can be lowered, towards the bottom of the bin. Hence, compaction can be adjustable.

The storage bin 58 is a container for holding reduced wood and debris. The storage bin 58 is preferably mounted at a back portion of the prime carrier. Mounting the storage bin at a back portion of the prime carrier provides improved operator sight during collection and shredding operations, especially at curbside in urban locations. The storage bin 58 has an opening 62 for receiving reduced material. The opening 62 is preferably provided below the ½ volume height of the storage bin and above the bottom of the bin as described above. The storage bin 58 may also be adapted for dumping or discharging stored material. Dumping may be to the rear or at the side opposite curb. As shown, the storage bin is hinged 64 upon a frame 66 and operatively couple to a series of hydraulics 70 (one of which is shown). The hydraulics and hinge provide means for emptying the bin by dumping reduced material and restoring the bin to the original position. In practice, the prime carrier is driven to a curbside location where removal of wood and/or debris is necessary. From within the cab, an operator activates the shredder assembly, conveyor and compactor, then gathers debris from the curbside using the collector. The gathered debris is dropped into the shredder input or hopper. The debris is slowly reduced and expelled through the output to the conveyor. The conveyor transports the reduced material to the compactor, which in turn moves the material into a lower section of the storage bin. As the storage bin fills, the weight of previously stored material presses against the incoming material to provide compaction. The prime carrier then drives to the next collection site. During travel to the next collection site, wood in the hopper may be continuously, but slowly shredded. When desired, such as when the bin is full, the prime carrier may be driven to a dumping location and emptied. Wood can also be dumped into a packer truck or open top truck at the site to allow the prime carrier to continue operation. Thus, what has been described is an method of wood collection and reduction which is suitable for single person operation along urban streets and roads with reduced noise and improved safety.

Referring now to FIGS. 3a and 3b, therein is generally depicted therein at 100a variable torque shredder for reducing wood in accordance with a preferred embodiment of the present invention. As shown, the tapered cutting drum has a cross-section with an outer diameter that is smaller than an outer diameter of another cross-section of said drum. FIG. 3a is a partial top view and FIG. 3b is a partial cross-sectional side view. The shredder 100 has a housing 102, a drive 122, and a tapered cutting drum 114 supported in the housing and connected to the drive 122. At least one of cutting blade 116 is disposed about an outer surface of the cutting drum 114. The shredder 100 also has an anvil 112, which preferably cooperates with the cutting drum 114 to form an acute cutting angle. An acute cutting angle provides means for capturing and pulling material into the cutting blades(s).

The shredder 100 also has an input 124 and an output 126 where wood or debris may be fed into the input 124, reduced, and expelled through the output 126. The input 124 may be a gravity feed chute. The gravity feed chute is preferably a collection hopper (as shown in FIG. 1) suitable for holding wood while the cutting drum/blades/anvil slowly reduce the wood. The hopper preferably has substantially vertical walls 128, 130. Substantially vertical walls 128, 130 decrease problems associated with incoming debris bridging over the cutting drum and interrupting the shredding process. If a hopper is provided, the anvil 112 and the cutting drum 114 form at least part of a floor 132 of the hopper where material sits until it is shredded or reduced. Hence, the floor 132 separates the shredder input 124 from the output 126. Alternatively, the input may be a side feed. If a side feed is provided, a feed roll may be added to the input to regulate the flow of incoming material to the cutting drum and reduce debris fly-back. To increase cutting efficiency, the side feed may have a sloping floor that angles toward the cutting blades for improving material delivery to the cutting implements.

As mentioned briefly above, the anvil 112 preferably cooperates with the cutting drum to form an acute cutting angle. The anvil 112 may be connected to the housing or formed integral therewith. The anvil 112 is adjacent the cutting drum 114 along a cutting axis and is separated by a gap to allow drum rotation. As shown, the anvil 112 is a plate which may be mounted to the housing or other support. The anvil 112 acts to regulate chip size and prohibit large pieces of debris from passing by the cutting drum without reduction. The cutting drum rotates about a center point of rotation. Preferably the anvil 112 is positioned adjacent the cutting drum below the center point of drum rotation. Positioning the anvil adjacent the cutting drum below the center point of drum rotation provides the acute cutting angle. By having an acute cutting angle, a pinch point for pulling material into the cutting blades may be provided that improves cutting and reduces the amount of ejected material. In a preferred embodiment, the anvil may be translatable or movable. By translating the anvil, the distance between the anvil and cutting drum may be adjusted to regulate the size of reduced material.

The anvil is preferably slotless. A slotless anvil reduces the chance of material becoming lodged at the anvil/cutting drum interface. Alternatively, the anvil may have a plurality of slots or notches to enhance material reduction. The slotted anvil is preferably matched with a cutting drum having a plurality of cutting blades that mesh with the slots of the anvil. In such case, the slots not only allow a cutting/ripping action but also provide a breaking action. Thus, the anvil 112 may not only provide means for adjusting the size of reduced material but may also provide an enhanced reducing mechanism.

The cutting drum has two ends and a middle section. The cutting drum is preferably a tapered cylinder. The cutting drum preferably tapers towards the middle section but may taper at one end, both ends, or any combination of the above. The cutting drum is preferably cone or frustum shaped, diamond shaped in cross section, double diamond shaped in cross section, or bow tie shaped in cross section. Diamond shaped, double diamond shaped and bow tie shaped drums may be provided by selectively tapering the cutting drum at ends and/or the middle section or by combining multiple cone shapes together.

The cutting drum 114 is preferably a cutting cone or includes a cutting cone, such as a cone, or frustum, e.g. a cutting cone. The cutting cone has a butt and a nose or nose end. The nose is the tapered portion of the cutting cone. The cutting cone provides a plurality of cutting radii with increasing torque along the cutting axis. The cutting cone also provides a plurality of increasing cutting speeds along the cutting axis.

The cutting drum preferably has a solid outer surface or is solid. The outer surface preferably has a plurality of pockets for carrying chips. Each pocket is preferably associated with a corresponding cutting implement. In a most preferred embodiment each pocket is disposed prior to the associated cutting implement and extends the same length at said implement. Preferably the cutting drum has a substantially uniform, smooth outer surface, other than the cutting blades, associated hardware, and pockets, The outer surface of the cutting drum or the cutting drum itself may be solid, or essentially solid, such as a solid cast alloy, forged machine steel, cast iron, etc. Alternatively, the cutting drum may be formed as a plurality of concentric disks of narrowing radii, which may also be formed of a solid cast alloy, forged machine steel, cast iron, etc. The concentric disks may have a center hole adapted to fit upon a shaft. The disks may be pinned to the shaft to fix them in place. The shaft in turn can be fixed to a drive. Forming the cutting drum with a plurality of concentric disks allows for ease of manufacture, especially for large cutting drums, which may be heavy and difficult to otherwise handle. The disks may be like a series of dumbbells of different sizes. The disks may form a series of steps or may form a gradually tapering surface. A Solid or essentially solid cutting drum provides increased stability so that the cone does not fly-apart during operation and also provides a flywheel effect with increased momentum so that chipping large branches does hamper the cutting blade. The solid cutting drum or the concentric disk-cutting drum may then be milled or welded to fix cutting blades in place. The cutting drum may have a hollow center portion, which may be suitable for fixing a drive shaft therein. Alternatively, the drum and the shaft may be a one-piece milled head and shaft.

The cutting drum is connected to a drive 122. The drive 122 provides rotation and power to the drum 114. The drive 122 may be a drive shaft connected to a flywheel, which is powered by a motor. The cutting drum may be further supported by a stub shaft at an end opposite the drive, which is journalled to a bearing for additional support. The stub shaft may be supported by the housing. The drive is preferably connected to an inner, tapered portion 136 of the drum. The drive 122 may be connected to the most tapered portion of the drum, is preferably connected within 40% of the most tapered portion, more preferably within 25% of the most tapered portion, and most preferably within 10% of the most tapered portion. By connecting the drive 122 to a most tapered part of the drum 114, torque can be substantially increased.

The cutting drum has at least one cutting implement or cutting blade. Preferably the cutting drum has a plurality of cutting blades disposed about the outer surface of the drum. In a first embodiment of the cutting blades, the cutting blades 116, 118, 120 are incrementally staggered about the drum surface to permit the pulling of debris toward a higher torque-cutting radius. The pattern may be a reverse screw or screw type pattern. Preferably, each cutting blade extends about 50% or less of the possible cutting axis or length of the cone, and more preferably extends about less than 20% of length of the cone, and most preferably less than 10% the length of the cone. Hence, each cutting blade cuts or impacts along a relatively small portion of the drum length (or cutting plane) as opposed to a long, single blade, which extends the length of the cutting drum. By having relatively small cutting blades, which do not extend along the entire length of the drum, a low speed, high torque cutting drum can be provided with substantially reduced jamming and blade breakage during operation.

Figure 7:
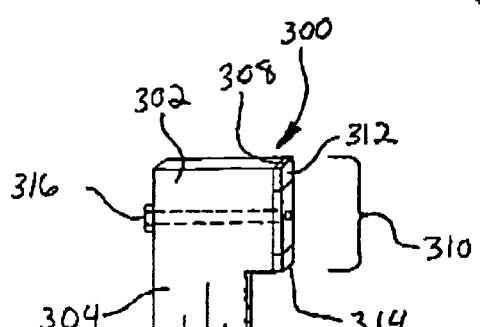
FIG. 7 is a side view in perspective of a cutting blade in accordance with a preferred embodiment of the present invention.

Referring now to FIG. 7, shown therein at 300 is an embodiment of a preferred cutting implement 300 in accordance with the present invention. As shown, the cutting implement 300 is a hammer. The hammer has a head 302 and a body 304. The body 304 is preferably cylindrical and has a depression for engaging a setscrew to fix the hammer to a cutting drum. The head 302 has a sharpened upper edge 308 for cutting wood. The sharpened upper edge 308 may be provided by a plate 310. The plate 310 is preferably square or rectangular, but may be any shape that matches a front portion of the head 302. The plate 310 is preferably rotatable with a first sharpened edge 312 at the top of the plate and a second sharpened edge 314 at the bottom of the plate. A rotatable plate with at least two sharpened edges allows the first sharpened edge, which has been dulled by use, to be quickly exchanged with a second sharper edge by simply loosening the plate and rotating the first edge out of position. As shown, the plate 310 is fixed to the head 302 with a bolt 316 that extends through the back of the head to engage and secure the plate in place. The hammer is preferably removably seated within the cutting drum and extends above the surface thereof The hammer may be held in place by a setscrew that engages the depression 306 in the body 304.

Figure 6:
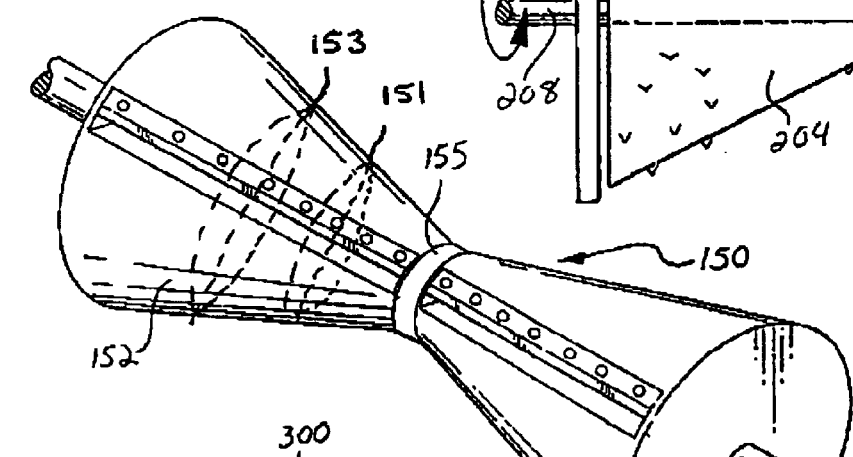
FIG. 6 is a partial side view of a variable torque shredder having coaxial cutting cones in accordance with a preferred embodiment of the present invention.
Figure 8:
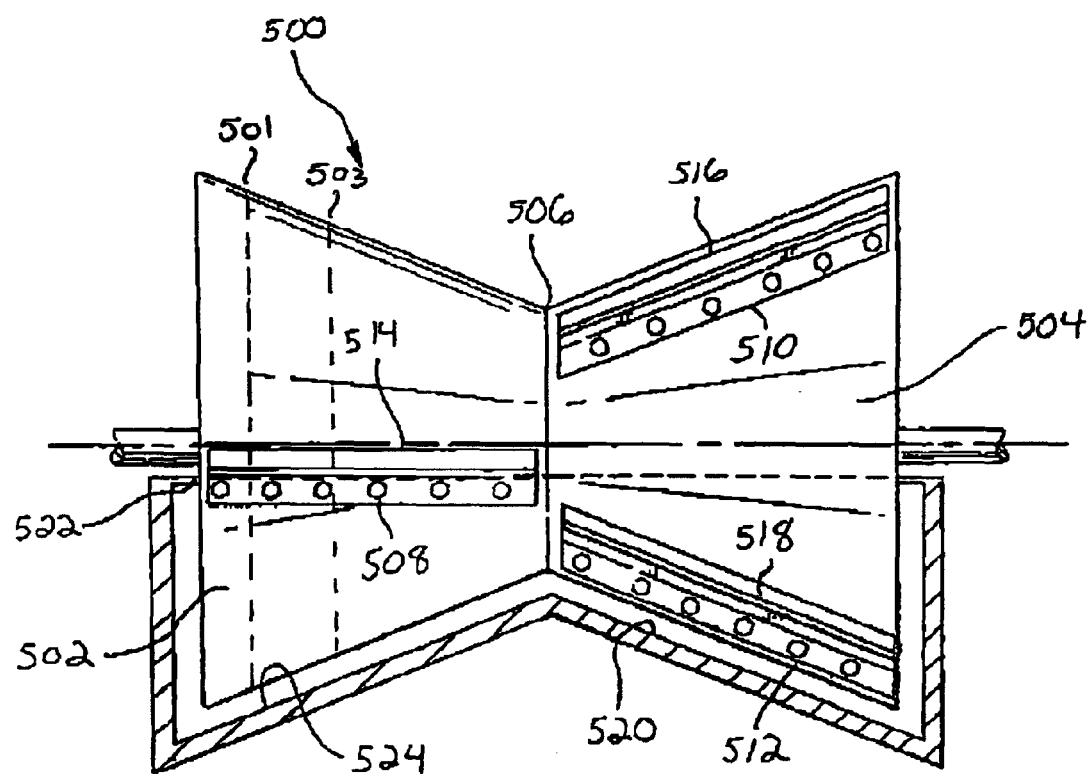
FIG. 8 is a rear view of a cutting drum with a bellyband in accordance with the present invention.

In a preferred embodiment of the cutting implements, as shown in FIGS. 6 and 8, the cutting blade(s) is (are) a long knife(s) or chisel(s) that extends longitudinally along the cutting axis of the cutting drum (not numbered in FIG. 6. elements 508, 510 and 512 of FIG. 8). Each knife may be connected to the cutting drum at an acute angel relative to the surface thereof to enhance chipping and material draw into the shredder. Preferably each cutting blade extends at least 50% of the length of the cutting zone, more preferably extends at least 90%, and most preferably extends substantially the entire length of the cutting zone, e.g. the exposed cutting region or section of a cone or cutting plane, i.e. plus or minus a few inches.

The drum shredder preferably includes more than one cutting drum, cutting cone, diamond shaped cutting drum, double diamond shaped cutting drum, or bow tie shaped cutting drum (the shapes being determined by cross-sectional view). When more than one cutting drum is provided, the cones can be positioned in a multitude of arrays as shown in FIGS. 3a–6, the arrays including: in parallel or in series, i.e. one next to the other; one across from the other; or both. By adding more than one cutting drum, a larger cutting axis with increased shredding efficiency can be obtained.

Referring now to FIG. 4, depicted therein at 138 is a preferred embodiment of a variable torque shredder having multiple cutting cones 140, 142 wherein the first cone 140 is mounted coaxial with the second cone 142. The cones 140, 142 are mounted butt to butt with each cone having a cutting region with a different cutting angle. The cones 140, and 142 are preferably attached to one another, and more preferably butted together. The cones 140, 142 share a drive 144 housed in a drive shaft tube 148 for protecting the shaft. The cones 140, 142 are further supported by a stub shaft 146, which is journalled to a bearing for support. The bearing in turn may be supported by the housing.

Figure 5:
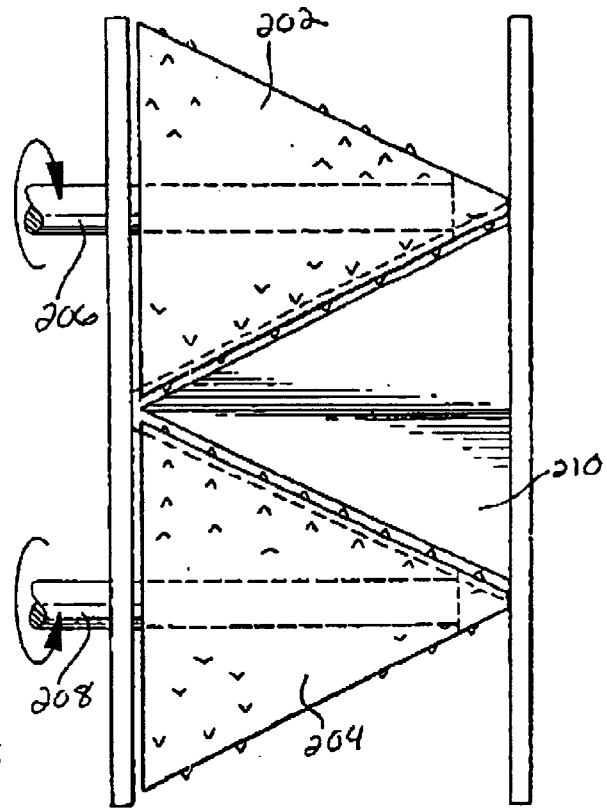
FIG. 5 is a partial top view of a variable torque shredder having coaxial cutting cones in accordance with a preferred embodiment of the present invention.

Alternatively, as shown in FIG. 5, or additionally, multiple cones or cone arrangements may be provided, such as mounted side-by-side. Multiple cones 202, 204 that are mounted side-by-side may be powered by the same or separate drives 206, 208. The separate drives may rotate the drums in the same direction or in opposite directions as desired. Any void space around the drums and not directly contacted by the drums, such as on the floor, may be filled by an inclined island 210 or wall. The island 210 preferably tapers at the top and slopes downward toward the edge of the anvil to guide material towards the blades.

Referring now to FIG. 6, depicted therein at 150 is a most preferred embodiment of a drum shredder, the shredder 150 having multiple cutting cones mounted co-axial and nose-to-nose. As shown, the tapered cutting drum has a cross-section 151 with an outer diameter that is smaller than an outer diameter 153 of another cross-section of said drum. The shredder 150 includes at least one anvil, two rotatable cutting cones 152, 154 mounted to at least one drive, the cutting cones cooperating with the anvil to provide compound cutting angles. Preferably the anvil is mounted at or below the axis of rotation to provide an acute cutting angle. As shown, the cutting cones may be separated by a spacer 155, such as a short drive shaft or rod. Each cutting cone 150, 152 has at least one cutting blade disposed along an outer surface of the cutting cone, but may alternatively have two, three or more cutting blades each. By adding more cutting blades, the rate at which material is drawn into the shredder can be increased. Each cutting blade preferably extends substantially the length of each respective cutting region or cone. The blades on each cutting cone may be mounted on the same cutting plane as the adjoining cutting cone (as shown in FIG. 6) or the blades may be staggered as shown in FIG. 8.

Referring now to FIG. 8, depicted therein at 500 is a drum shredder having a cutting drum 506 in accordance with the present invention. The cutting drum 506 includes a pair of frustums 502, 504 fixed together at their respective nose ends, which in turn forms a single drum 506 that tapers at a middle section. Preferably, the drum tapers evenly to the center so that the drum is balanced and may cut uniformly. The angle of the tapering is preferably adapted to be wide enough to accommodate branches having a desired diameter and is preferably in proportion to the feed and the drive. The angle between the frustums is preferably at least 90 degrees. Each frustum or region 502, 504 has at least one cutting blade 508, 510, 512 disposed along an outer surface thereof, but may alternatively have two, three or more cutting blades each. Each cutting blade preferably extends substantially the length of each respective cutting region. Each cutting blade preferably has a pocket 514, 516, 518 associated with it for carrying chips. The pockets are preferably disposed in the surface of the drum. The shredder 500 preferably has a bellyband 520 that conforms with the cutting drum 506. The bellyband preferably extends from the cutting plan 522 to the bottom most portion 524 of the cutting drum 506.

The drum shredder 500 has a plurality of cutting zones or regions with varying distances from the input. As shown, the tapered cutting drum has a cross-section 503 with an outer diameter that is smaller than an outer diameter 501 of another cross-section of said drum. A first cutting zone has a speed faster than a second cutting zone. The second zone has a higher torque than the first zone. The first zone angles inward toward the second zone in the direction of material feed. For example, as two cutting cones meet nose to nose, material will typically contact the outer regions of the cones first, as they have a greater radius and are positioned closer to the shredder input. As material is shredded, it is pulled inward by the action of the cutting blades and the angle of the cutting cone surface to a second cutting region of higher torque. The nose-to-nose arrangement thereby provides enhanced draw and improved cutting.

In practice, wood is collected and placed in the feed where it is contacted by the blades of the cutting drums. Lighter materials are quickly shredded by the cutting action of the blades. The reduced material passes through the gap between the anvil and the drums and is discharged through the output. Heavier branches will tend to move progressively along the incline cutting cones to a higher torque portion thereof, either by gravity or by the design of the cutting blades and the configuration of the cutting cones, or all of the above. The high torque, slower speed region of the cutting cones can then be effectively utilized to reduce large branches, even at a slower speed.

Figure 9:
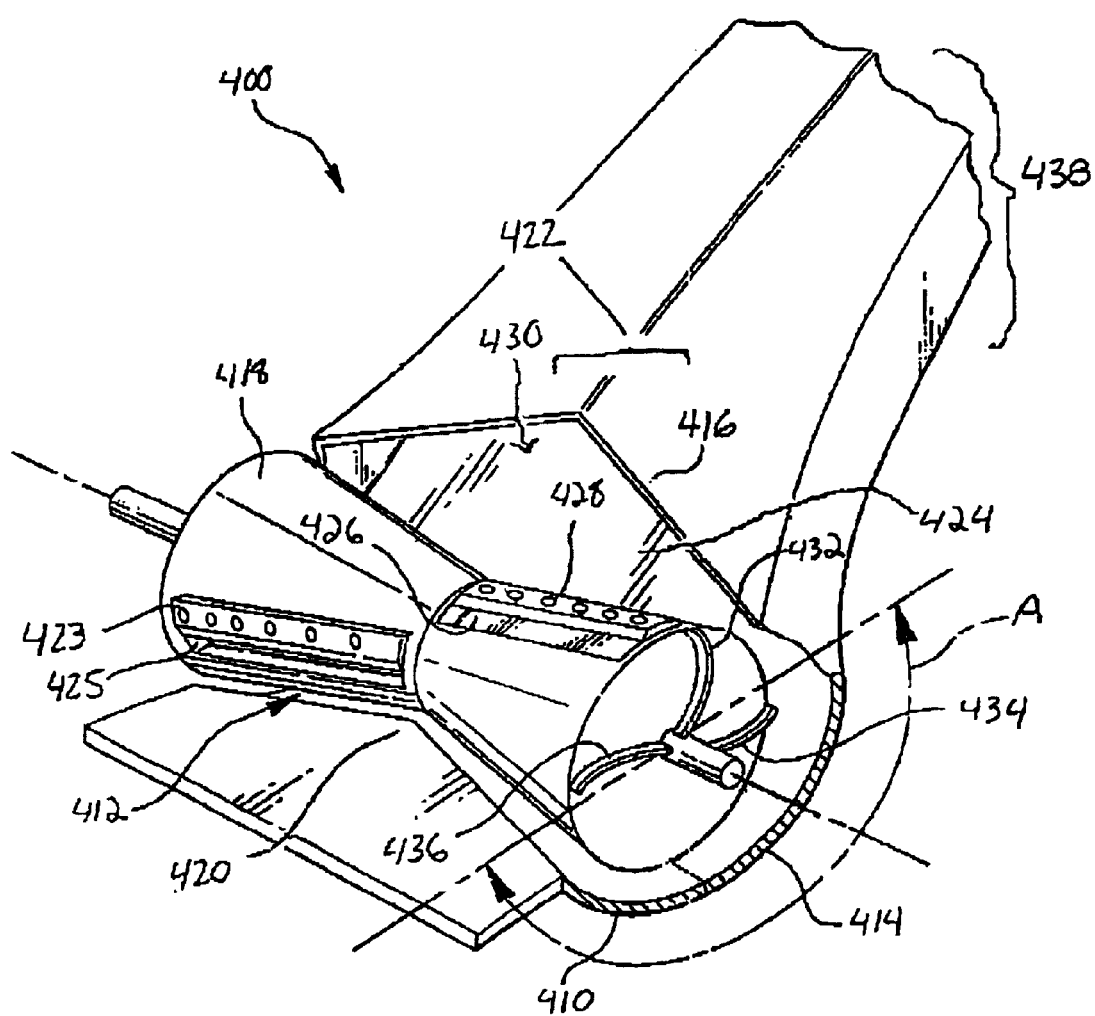
FIG. 9 is a side view in perspective of a drum shredder with a discharge assembly in accordance with the present invention.
Figure 10:
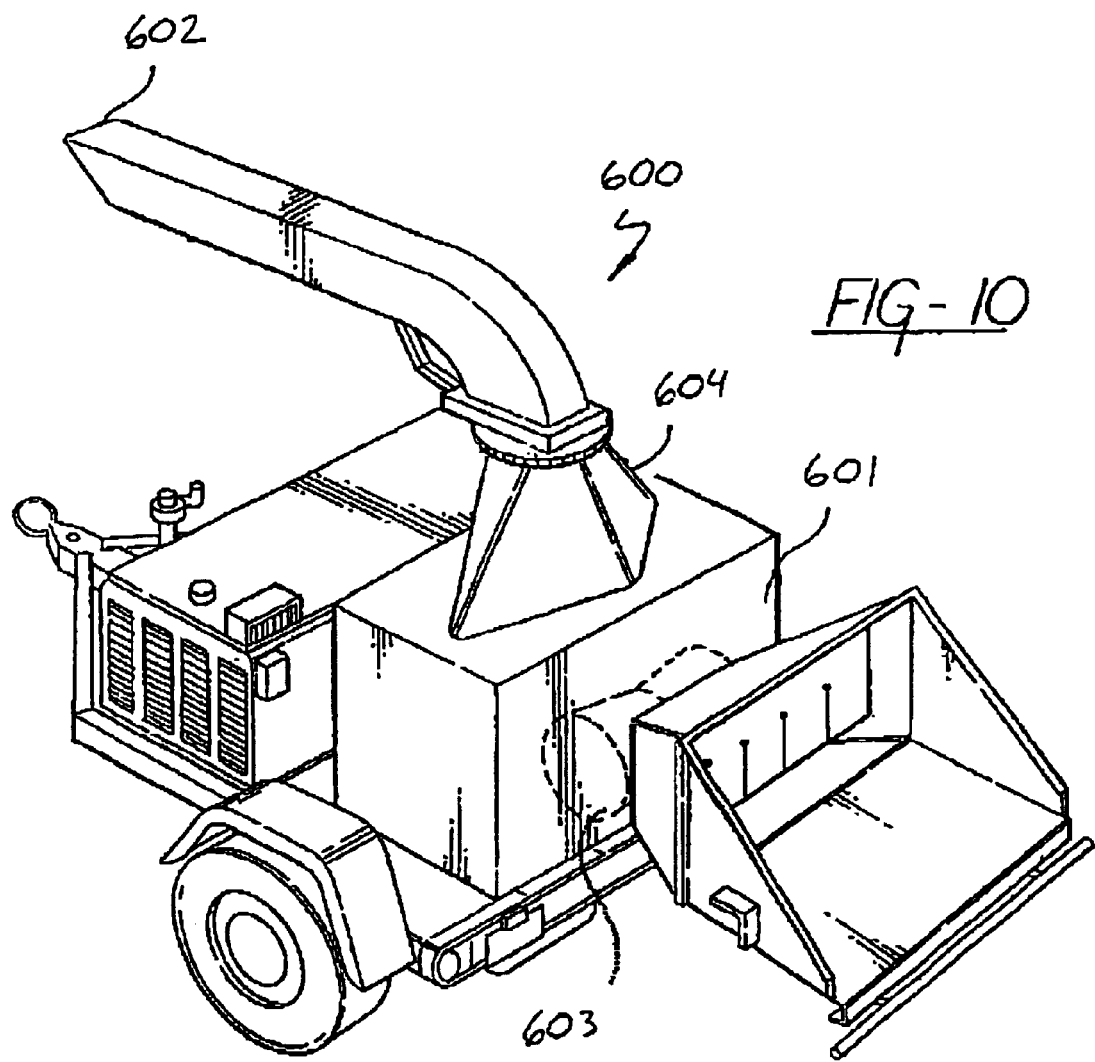
FIG. 10 is a perspective view of a drum shredder with a discharge assembly in accordance with an embodiment of the present invention showing a cutting drum in phantom.

Referring now to FIG. 9, depicted therein at 400 is a discharge assembly for allowing chipped material to be effectively dispelled from the shredder into an awaiting vehicle or onto the ground substantially clear of the unit. The discharge assembly 400 includes a bellyband 410 which forms a space that is in communication with the chipping zone 412 or material/blade contact plane; a transition 414 in communication with the bellyband 410; and a discharge port in communication with the transition 414. As shown in FIG. 10. the drum shredder 600 may include a cutting drum 603 rotatably mounted in a housing 601. As shown, the drum-shredder 600 has a transition 604 and a discharge port 602 for discharging chipped material. If the shredder has a bellyband that partially wraps the cutting drum, the bellyband would open into the transition which in turn may open into the discharge port to form the discharge assembly.

The bellyband 410 is a housing that follows the surface of the cutting drum 418 to guide reduced material to the transition 414. The bellyband 410 preferably begins adjacent to the anvil 420 and follows an arc A around the cutting drum 418. The arc A is defined as beginning where chipping takes place (the material/blade contact plane), which is defined as 0 degrees. The point or plane of the arc A directly opposite the cutting point this line is then defined herein as 180 degrees. The bellyband provides a space between the bellyband and the cutting drum for chips to travel in. The bellyband may have a front wall and a set of sidewalls. The bellyband preferably conforms with the shape of the cutting drum. In a preferred embodiment hereof, where the cutting drum is tapered, the bellyband is formed with a multi-sided, and/or multi angled front wall 422 that conforms to the angle of the tapered drum. For example, if the drum is 'bow tie' shaped in cross-section, or tapered toward a middle section, the bellyband will have a wall with surface having a 'v-shaped' cross-section. The space between the bellyband and the cutting drum is preferably uniform or substantially uniform along the length and width of the bellyband. The clearance of the bellyband from the cutting implements is preferably ⅛th of an inch or less and more preferably 1/16th of an inch or less. The bellyband preferably extends along less than 180 degrees, more preferably extends along less than 135 degrees, more preferably extends along less than the 120 degrees and more preferably less than 95 degrees of the arc A. The bellyband preferably extends along at least 90 degrees of the arc A. In relative terms, the bellyband preferably extends to the point (or plane) of the arc that includes the lowest point of the cutting drum, but is preferably less than 10 degrees past this point. The bellyband 410 terminates at the transition 414.

The transition 414 is a housing that allows chips to be guided away and upward from the cutting drum and/or the bellyband to be discharged from the machine. The transition begins at a point where the distance from the cutting drum increases (over that of the bellyband, which is substantially uniform). The transition 414 ultimately tapers along a length to a discharge port (not shown), which may be circular, ovular, square or rectangular. The transition 414 may be attached to the bellyband 410 or any other suitable structure, such as the housing. The transition 414 preferably guides the direction of chips beginning as close to the bottom, most point of the are of the chipper housing or at the point where the bellyband ends and away from the cutting drum. As shown the transition has a series of walls, including sidewalls, a front wall and a rear wall. The sidewalls of the transition are slanted away from the cutting drum and may be slanted inward and upward so as to ultimately intersect above and forward of the cutting drum. The volume of the space created by the transition is preferably greater than that of the bellyband. Attached to the sidewalls may be a frontal wall 424 and rear wall 422. The frontal wall begins where the bellyband ends and preferably begins at the bottom most point of the cutting drum 418. The frontal wall 424 preferably extends forward and upward on the same plane as the sidewalls, gradually tapering so as to intersect at the same point above and away from the cutting head as the sidewalls.

The rear wall 422 is the wall nearest the cutting drum. The rear wall 422 is preferable shaped to conform to the shape of the cutting drum. The rear wall preferably forms an extended void directly after the bellyband. The rear wall 422 is preferably multi-sided, such as two-sided (as shown), circular, three-sided, or more. If the rear wall is two sided and the transition includes a front wall and two side walls, the transition will have at least 5 sides, shown at 438. For example, in accordance with a preferred embodiment, i.e. where the cutting drum is tapered toward the center of the drum, the rear wall may be 'v shaped' to create a void conforming to the "v" shaped angle of the cutting head. The rear wall may be formed by a 2-paneled assembly, tapered upward and away from the cutting head to create an entry space with an extended void for chips discharged from the center of the tapered cutting drum to enter. The extended void is ultimately enjoined by the 2 inclined side-walls and tapered forward to ultimately intersect at an imaginary point upward and forward of the cutting drum. The discharge port is preferably provided at a point of 5" to 10" below the intersection point of the side walls and most preferably about 8" or more below the intersecting point of the side, front, and rear walls.

In practice wood chips are produced at the cutting zone by cutting knives and the anvil. The chips are carried in the space between the bellyband and the cutting drum, and may be carried in one or more pockets 425, 426 disposed below each cutting blade 423, 428. The shape of the bellyband may then act to separate or keep separate the two or more major chip steams to enhance forward directional momentum by reducing chip collisions. The chips exit the space of the bellyband 410 away from the drum into the transition 416. The extended void 430 of the transition allows chips traveling in the center of the chipper to be efficiently discharged from the bellyband with reduced chip collisions.

In a taper drum application the reduced material is expelled in at least two major discharge streams. The discharge streams also have at least two different major discharge directions or angles. By using a bellyband and a transition in accordance with the present invention, at least two major discharge directions can be accommodated to reduce chip collision and enhance chip discharge through the discharge port.

While the invention has been illustrated in detail in the drawings and the foregoing description, the same is to be considered as illustrative and not restrictive in character. For example the shredder of the present invention may be adapted for shredding tires, appliances, etc, with only slight or no modifications to the invention hereof. Therefore, it should be understood that only the preferred embodiments have been shown and described fully and that all changes and modifications that come within the spirit and scope of the invention are desired to be protected.

What is claimed is:

1. A drum shredder for reducing material comprising
a housing;
a tapered cutting drum rotatably mounted within the housing, the tapered cutting drum having a cross-section with an outer diameter that is smaller than an outer diameter of another cross-section of said drum;
at least one cutting implement disposed about an outer surface of the tapered cutting drum;
an anvil adjacent to the tapered cutting drum;
a drive connected to the tapered cutting drum; and
a bellyband that partially wraps the tapered cutting drum.

2. The drum shredder of claim 1, wherein the anvil cooperates with the cutting drum to provide an acute cutting angle.

3. A drum shredder for reducing material comprising
a housing;
a tapered cutting drum rotatably mounted within the housing, the tapered cutting drum having a cross-section with an outer diameter that is smaller than an outer diameter of another cross-section of said drum;
at least one cutting implement disposed about an outer surface of the tapered cutting drum;
an anvil adjacent to the tapered cutting drum;
a drive connected to the tapered cutting drum; and
a bellyband that partially wraps the tapered cutting drum, wherein the cutting drum has two ends and a middle section, the cutting drum being tapered toward the middle section to form two regions, each region having at least one cutting implement.

4. The drum shredder of claim 1, wherein the cutting drum is tapered toward both ends.

5. The drum shredder of claim 1, further comprising at least one pocket disposed in the surface of the tapered cutting drum, each of said at least one pocket being associated with each of said at least one cutting implement for carrying reduced material produced from said at least one cutting implement.

6. A drum shredder for chipping and discharging wood comprising:
a housing;
at least one tapered cutting drum rotatably supported in the housing, the tapered cutting drum having a cross-section with an outer diameter that is smaller than an outer diameter of another cross-section of said drum;
at least one cutting implement supported by the tapered cutting drum;
a bellyband at least partially wrapping the tapered cutting drum;
a transition in communication with the bellyband; and
a discharge port in communication with the transition.

7. The drum shredder of claim 6, wherein the transition has a non-linear rear wall.

8. The drum shredder of claim 6, wherein the transition has a multi-sided rear wall.

9. The drum shredder of claim 6, wherein the transition has a substantially v-shaped or substantially inverted v-shaped wall.

10. The drum shredder of claim 6, wherein the transition has a semi-circular wall.

11. The drum shredder of claim 6, wherein the transition has at least 5 sides.

12. The drum shredder of claim 6, wherein the bellyband has a substantially 'v-shaped' or substantially inverted 'v-shaped' wall.

13. The drum shredder of claim 6, wherein each cutting implement has a pocket for carrying reduced material associated with it, each pocket being disposed in the surface of the tapered cutting drum.

14. The drum shredder of claim 13, wherein the shape of the bellyband conforms with the shape of the tapered cutting drum.

15. The drum shredder of claim 6, wherein the outer surface of the tapered cutting drum is tapered toward the middle of said drum.

16. The drum shredder of claim 1, wherein the tapered cutting drum further includes an essentially solid outer surface.

17. The drum shredder of claim 3, wherein the tapered cutting drum further includes an essentially solid outer surface.

18. The drum shredder of claim 17, further comprising at least one pocket disposed in the surface of the tapered cutting drum, each of said at least one pocket being associated with each of said at least one cutting implement for carrying reduced material produced from said at least one cutting implement.

19. The drum shredder of claim 17, wherein the bellyband wraps the tapered cutting drum at a substantially even distance away from said tapered cutting drum.

20. The drum shredder of claim 3, wherein each cutting implement extends along at least 50% of each region.

21. The drum shredder of claim 3, wherein the bellyband includes a multi-sided, or multi-angled wall that conforms to the tapered drum.

* * * * *